July 2, 1963     N. A. POULOS     3,096,258

METHOD OF OPERATING AN ELECTROLYTIC ANALYSIS CELL

Filed Sept. 4, 1959

Nicholas A. Poulos
*INVENTOR.*

BY *Adams, Forward & McLean*

ATTORNEYS

3,096,258
METHOD OF OPERATING AN ELECTROLYTIC ANALYSIS CELL

Nicholas A. Poulos, Niagara Falls, N.Y., assignor to Olin Mathieson Chemical Corporation, a corporation of Virginia
Filed Sept. 4, 1959, Ser. No. 838,355
1 Claim. (Cl. 204—1)

This invention relates to operation of a cell suitable for use in detecting and measuring small concentrations of gaseous boranes in air.

Copending application Serial No. 779,496, filed December 10, 1958, of Nicholas A. Poulos describes a cell suitable for use in detecting and measuring small concentrations of gaseous boranes in air. The cell therein described includes a silver wire electrode coated with a paste consisting essentially of a silver salt and a homogeneous electrolyte solution, an adsorbent material wetted with the homogeneous electrolyte solution surrounding the coated silver wire electrode, and a platinum wire electrode surrounding the wetted absorbent material and separated thereby from the coated silver wire electrode. The homogeneous electrolyte solution has for a solvent a mixture of water, a polyol having 2 to 6 carbon atoms and 2 to 6 hydroxyls, and a glycol ether of the formula RO—$(CH_2CH_2O)_n$—R′, wherein $n$ is an integer from 2 to 4, R is an alkyl radical having 1 to 4 carbon atoms, and R′ is hydrogen or an alkyl radical having 1 to 4 carbon atoms. The solute is an alkali metal salt. The electrolyte is advantageously prepared by dissolving the salt in water, admixing the so formed aqueous solution with the polyol, and adding the resulting admixture to the glycol ether.

Although the cell described in application Serial No. 779,496 is extremely sensitive for all of the boranes, i.e. providing rapid responses for concentrations of the order of one part per million of borane in air, the recovery time after exposure of the cell to certain of the boranes, particularly the decaboranes and alkyl decaboranes, is of the order of one-half hour. During this period the potential of the cell is gradually reduced to zero and the reading on any indicating device, such as a microammeter, returns to normal.

It has now been found that the recovery time for the type of cell described in Serial No. 779,496 after exposure to, for example decaborane, can be accelerated by passing into the cell an air stream containing a few parts per million of chlorine. Hence the present invention comprises a method for reducing to zero potential a cell which has been used in detecting and measuring small concentrations of gaseous boranes in air by passing into the type of cell described in Serial No. 779,496 for from about 20 to 60 seconds of air stream containing from about 1 part to 10 parts per million of chlorine.

Figure 1:
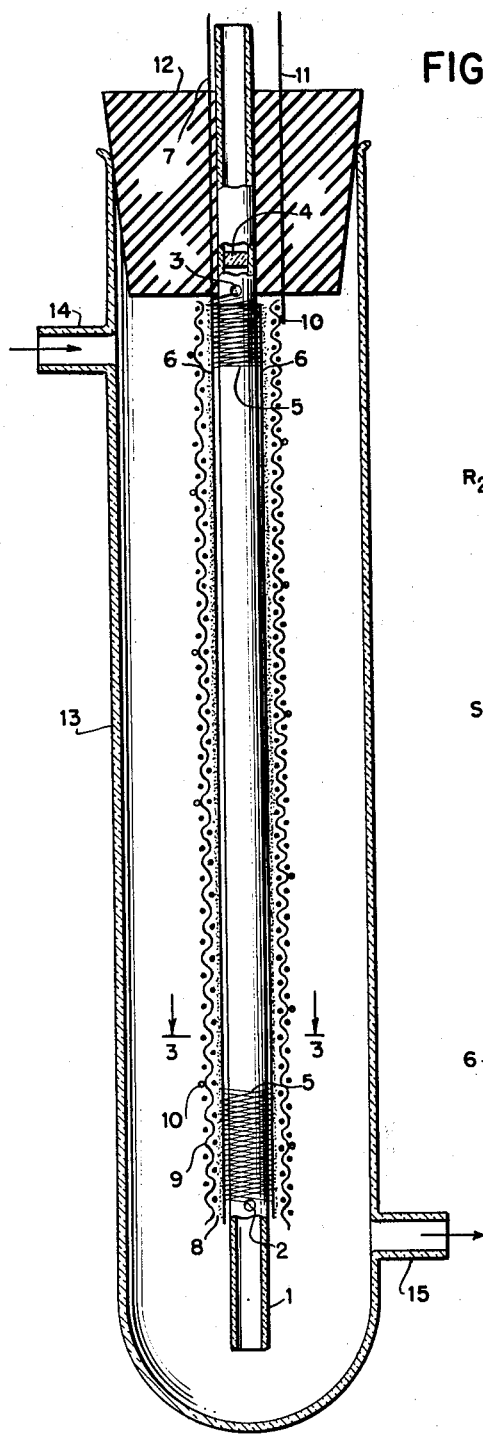
Figure 2:
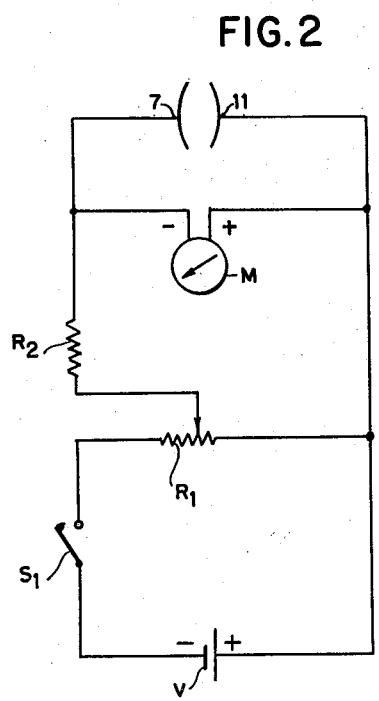
Figure 3:
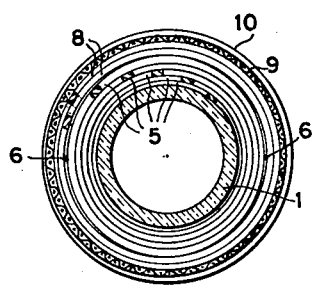

A typical cell described in application Serial No. 779,496 is depicted in FIGURE 1 of the accompanying drawing and a typical electrical circuit incorporating the cell shown in FIGURE 2. FIGURE 3 is a cross section along line 3—3 of FIGURE 1.

In FIGURE 1, numeral 1 indicates a length of 8 mm. Pyrex tubing 15 cm. long having two pairs of 2 mm. holes therein, 2 and 3, and containing a glass plug 4. The length of tubing 1 extending between holes 2 and 3 is wrapped with five layers of a #10 cotton thread, which wrapping is indicated as 5. A piece of 0.078″ diameter silver wire 6 extends down each side of tube 1 and connects with terminal 7. The silver wire 6 is coated with a total of about 1.0 gram of a paste obtained by admixing 0.2 gram of silver carbonate with about 1.0 cc. of a potassium carbonate solution obtained by dissolving 7.5 grams of potassium carbonate in 200 ml. of water, admixing the resulting solution with 200 ml. of propylene glycol, and adding the resulting admixture to 400 ml. of the dimethyl ether of tetraethylene glycol. In the resulting homogeneous solution, the solvent is 6.6% by volume water, 33.3% by volume propylene glycol, and 60% by volume of the dimethyl ether of tetraethylene glycol, and the concentration of potassium carbonate is about 2% by weight of the final solution. The coated wire 6 extending along each side of tube 1 is wrapped with two layers of a #10 cotton thread, which wrapping is indicated as 8. A piece of platinum gauze 9 of 52 mesh and 0.008″ diameter about 4.5 by 1.5 inches surrounds wrapping 8 and is tightly trussed with 0.078″ platinum wire 10 connected with terminal 11. This assembly is then dipped in the potassium carbonate solution described above and inserted into the hole in neoprene stopper 12 which in turn is inserted into Pyrex tube 13 having gas inlet opening 14 and gas outlet opening 15.

The above cell assembly was employed in detecting the presence of boranes in air as described in the following examples.

Example I

The electrode terminals 7 and 11 were connected to the detection circuit shown in FIGURE 2, including 0–100 microampere D.C. meter, M; 0–10,000 ohm wire wound potentiometer, $R_1$; 20,000 to 30,000 ohm, one-fourth watt carbon resistor, $R_2$ toggle switch, $S_1$, and a 7.5 volt battery, V. Toggle switch $S_1$ was closed and the resistances $R_1$ and $R_2$ were adjusted to give a reading of 100 microamperes on meter M. A warm-up period of about five minutes was sufficient to give a steady reading. Clean air was then drawn through gas inlet 14 at a rate of about 5 liters per minute and the reading remained steady. To insure that the air is clean, a small cartridge containing activated charcoal can be placed over gas inlet 14.

A sample of air containing 0.3 part per million of decaborane was prepared by passing a stream of clean air over a small amount of decaborane. A portion of this sample was then drawn through gas inlet 14 at a rate of about 5 liters per minute for about 2 minutes and gave a deflection of 12–15 microamperes on meter M. Clean air was then substituted for the contaminated sample and the contaminated air was flushed from the system. The meter reading returned to normal, e.g. 100 microamperes, in about one-half hour.

Another portion of the air containing 0.3 part per million of decaborane was drawn through gas inlet 14 at a rate of about 5 liters per minute for about 2 minutes and gave a deflection of 12–15 microamperes on meter M. A gas stream containing about 1 p.p.m. of free chlorine, obtained by passing an air stream over the surface of a 1% to 5% solution in water of calcium hypochlorite (70% available chlorine), was then substituted for the contaminated sample and drawn through gas inlet 14 at a rate of about 5 liters per minute for 35 seconds. During this time there was about a 110 microampere reading on meter M. Clean air was then substituted for the chlorine containing gas stream and after one minute the meter reading returned to normal.

Example II

A sample of air containing 0.3 part per million of ethyldecaborane was prepared by admixing ethyldecaborane with clean air. The ethyldecaborane was prepared by the method described in Altwicker et al. application Serial No. 497,407, filed March 28, 1955, now Patent No. 2,999,117. A portion of this sample was then drawn through gas inlet 14 at a rate of about 5 liters per minute for about 2 minutes and gave a deflection of 12–15 microamperes on meter M. Clean air was then substituted for the contaminated sample and the contaminated air was flushed from the system. The meter returned to normal in about 30 minutes.

Another portion of the air containing 0.3 parts per million of ethyldecaborane was drawn through gas inlet 14 at a rate of about 5 liters per minute for about 2 minutes and gave a deflection of 12–15 microamperes on meter M. A gas stream containing about 1 p.p.m. of free chlorine, obtained by passing an air stream over the surface of 1 to 5% solution in water of calcium hypochlorite (70% available chlorine), was then substituted for the contaminated sample and drawn through gas inlet 14 at a rate of about 5 liters per minute for 35 seconds. During this time there was about a 110 microampere reading on meter M. Clean air was then substituted for the chlorine containing gas stream and after one minute the meter reading returned to normal.

I claim:

A method for reducing to zero potential a cell which has been used in detecting and measuring small concentrations of gaseous boranes in air which comprises passing into the cell a gas stream comprising chlorine in an amount and for a time sufficient to reduce the cell to zero potential, said cell comprising a silver wire electrode coated with a paste consisting essentially of a silver salt and an electrolyte solution, a non-conducting absorbent material wetted with the electrolyte solution surrounding the coated silver wire electrode, and a platinum wire electrode surrounding the wetted absorbent material, the electrolyte being a homogeneous solution wherein the solvent is a mixture of water, a polyol having 2 to 6 carbon atoms and 2 to 6 hydroxyls, and a glycol ether of the formula $RO-(CH_2CH_2O)_n-R'$, wherein $n$ is an integer from 2 to 4, R is an alkyl hydrocarbon radical having 1 to 4 carbon atoms, and R' is selected from the class consisting of hydrogen and an alkyl hydrocarbon radical having 1 to 4 carbon atoms, and wherein the solute is an alkali metal salt.

No references cited.